(No Model.)
H. S. ARNTFIELD.
BELT COUPLING.
No. 555,064.                         Patented Feb. 25, 1896.
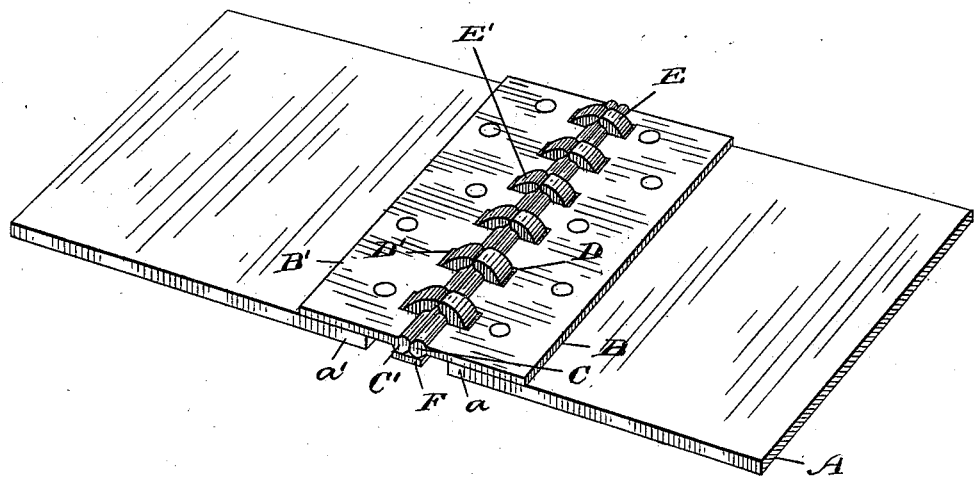
Witnesses
Inventor

UNITED STATES PATENT OFFICE.

HENRY S. ARNTFIELD, OF PRESTON, CANADA.

BELT-COUPLING.

SPECIFICATION forming part of Letters Patent No. 555,064, dated February 25, 1896.

Application filed April 18, 1895. Serial No. 546,280. (No model.)

*To all whom it may concern:*

Be it known that I, HENRY S. ARNTFIELD, of Preston, in the county of Waterloo and Province of Ontario, Canada, have invented certain new and useful Improvements in Belt-Couplers; and I hereby declare that the following is a full, clear, and exact description of the same.

This invention relates to certain new and useful improvements in the method of coupling the adjacent meeting edges of belts for the transmission of power, and relates more particularly to a coupler of sufficient flexibility and resiliency to permit the belt to readily adapt itself to the surface of the pulley while passing around the same to allow of the belt assuming any position or shape into which the belt could naturally be twisted, and to so construct the belt-coupler that it can be readily and cheaply manufactured and easily attached to the adjacent meeting edges of the belt; and the invention consists essentially of squaring each of the adjacent meeting edges of the belt (as if to form a butt-joint) and riveting or otherwise fastening to each of the adjacent meeting ends of the belt a metallic plate having a series of openings therein, and a coupling-plate formed with a series of fingers on each side thereof adapted to engage in and to interlock with the openings in the plates on the ends of the belt to form a yielding coupling or joint, the fingers of the coupling-plate being preferably closed on the outer side of the belt in order that they will be prevented from coming into contact with the pulley-surface and reducing the area of the belt (at the joint) in contact with the pulley-surface and reducing the driving-power of the belt at the time the joint is passing over the pulley, preventing any unnecessary movement of the belt on the pulley-surface, or friction between the joint and the belt, particularly when the latter is passing over a pulley of smaller diameter, and preventing any friction which may be due to whatever amount of side slip the belt may experience, and preventing the joint wearing and in the course of time breaking, the whole device being hereinafter more fully set forth and more particularly pointed out in the claims.

In the accompanying drawing is illustrated a perspective view of my improvements in belt-couplers.

Like letters of reference refer to like parts throughout the specification and drawing.

The ends $a\ a'$ of the belt A are squared as if to form a body-joint. Riveted or screwed to the end $a$ of the belt A is a metallic plate B, one side of which projects slightly beyond the edge of the end $a$ of the belt. The projecting side of the plate B is ribbed to form a substantially rounded bar C, which serves as a pintle for the interlocking coupling or finger-plate.

Formed through the projecting portion of the plate B are a series of openings D, which extend from the inner side of the bar C inwardly into the body of the plate. The openings D correspond in size, location, and number with the size, location, and number of the fingers E, and these openings D are adapted to receive the said fingers and allow of the fingers encircling or partially encircling the pintle C. As shown in the drawing, there is also connected to the end $a'$ of the belt a similar metallic plate B′, having a pintle C′ and openings D′. The finger-plate consists of a bar F, with one side of which is integrally formed a series of hook-shaped fingers E, corresponding in number, location, and size with the number, location, and size of the openings D in the metallic plate B, and with the other side of which is integrally formed a series of hook-shaped fingers E′, corresponding in number, location, and size with the number, location, and size of the openings D′ in the plate B′. In coupling together the adjacent meeting edges of the belt the hook-shaped fingers E E′ respectively are passed through their respective openings D D′, and to prevent the possible separation of these fingers from their respective pintles C C′ the fingers are pressed together until no space between them is left. The hook-shaped fingers E E′, working on the pintles C C′, allow of the belt adapting itself to the pulley-surface. By this use of the metallic plates it is possible to tighten the belt without any loss of material, as the plates are screwed on the ends of the belt, and the slack can be readily taken up by moving the plates to another position on the belt. To enable the coupler to be used on either side it is possible by covering the metallic plates with leather to allow of the double use of the belt without interfering with the coupler as it is passing over the face of the pulley.

By forming the plates with pintle-shaped terminations the parts of the connections are strengthened and the coupling-plate can be secured in position to keep the ends abutting and at the same time leaving the union sufficiently flexible and yielding to conform to the contour of the wheel. The particular construction and adaptability of the coupling dispenses with the wear accompanying couplings merely hooked together.

Having thus fully described my invention, what I claim as new, and desire to secure by Letters Patent, is—

1. A belt-coupler, comprising two metallic plates adapted to be secured to adjacent meeting ends of the belt, and formed with pintle-shaped ends, and a series of openings adjacent to the pintles, and a coupling-plate formed with a series of coupling-fingers on each side thereof, adapted to engage in the openings of the plates and to be struck down and surround the pintles closely adjacent to each other, substantially as described.

2. A belt-coupler, comprising counterpart plates B, B', formed with pintles C, C', at their adjacent meeting edges, and a series of openings D, D', in each plate in alignment with each other, and a coupling-plate F, formed with coupling-fingers E, E', on each side thereof adapted to engage in the openings of the plates and encircle the abutting pintles, substantially as set forth.

Preston, March 22, A. D. 1895.

H. S. ARNTFIELD.

In presence of—
  W. B. N. KIMBER,
  W. J. MILLICAN.